US009588616B2

(12) United States Patent
Miller et al.

(10) Patent No.: US 9,588,616 B2
(45) Date of Patent: Mar. 7, 2017

(54) CANTILEVERED DISPLACEMENT SENSORS AND METHODS OF DETERMINING TOUCHING FORCES ON A TOUCH SCREEN

(71) Applicant: Corning Incorporated, Corning, NY (US)

(72) Inventors: William James Miller, Horseheads, NY (US); Lucas Wayne Yeary, Corning, NY (US)

(73) Assignee: Corning Incorporated, Corning, NY (US)

( * ) Notice: Subject to any disclaimer, the term of this patent is extended or adjusted under 35 U.S.C. 154(b) by 158 days.

(21) Appl. No.: 14/703,316

(22) Filed: May 4, 2015

(65) Prior Publication Data

US 2015/0324055 A1 Nov. 12, 2015

Related U.S. Application Data

(60) Provisional application No. 61/989,057, filed on May 6, 2014.

(51) Int. Cl.
*G06F 3/041* (2006.01)
(52) U.S. Cl.
CPC .......... *G06F 3/0416* (2013.01); *G06F 3/0414* (2013.01); *G06F 2203/04104* (2013.01); *G06F 2203/04105* (2013.01)
(58) Field of Classification Search
CPC ................ G06F 3/041–3/047; G06F 3/0414
See application file for complete search history.

(56) References Cited

U.S. PATENT DOCUMENTS

| 4,455,452 A | 6/1984 | Schuyler |
| 4,698,460 A | 10/1987 | Krein et al. |
| 4,733,222 A | 3/1988 | Evans |

(Continued)

FOREIGN PATENT DOCUMENTS

| DE | 102012203831 | 9/2013 |
| EP | 2320309 | 2/2014 |

(Continued)

OTHER PUBLICATIONS

Puetz et al; "Liquid Film Spray Deposition of Transparent Conducting Oxide Coatings"; Thin Solid Films 442 (2003) 40-43.

(Continued)

*Primary Examiner* — Gene W Lee
(74) *Attorney, Agent, or Firm* — Jason A. Barron (57) ABSTRACT

Cantilevered displacement sensors with enhanced displacement sensitivity and methods of determining touching forces for multiple touch locations are disclosed. The cantilevered displacement sensors support the touch screen adjacent a touch screen perimeter. A displacement of the touch screen is amplified by a cantilevered member that extends over a proximity sensor. Touching forces at multiple touch locations are determining by performing a fit to the measured displacements based on the touch locations to obtain displacements at all positions of the touchscreen, then relating the displacement of the touch screen at the multiple touch locations to applied distributed loads at the respective multiple touch locations, and then multiplying the applied distributed loads by the corresponding touch-location area.

15 Claims, 5 Drawing Sheets

(56) References Cited

U.S. PATENT DOCUMENTS

| | | | |
|---|---|---|---|
| 5,038,142 A * | 8/1991 | Flower | G06F 3/0414 341/34 |
| 7,254,755 B2 | 8/2007 | de Obaldia et al. | |
| 8,248,376 B2 | 8/2012 | Brown et al. | |
| 8,553,009 B2 | 10/2013 | Murphy et al. | |
| 8,599,165 B2 | 12/2013 | Westhues et al. | |
| 8,654,524 B2 | 2/2014 | Pance et al. | |
| 2002/0149571 A1 * | 10/2002 | Roberts | G06F 3/0414 345/174 |
| 2008/0202824 A1 | 8/2008 | Philipp et al. | |
| 2012/0023459 A1 | 1/2012 | Westerman | |
| 2012/0068971 A1 | 3/2012 | Pemberton-Pigott | |
| 2012/0105358 A1 | 5/2012 | Momeyer et al. | |
| 2012/0154317 A1 | 6/2012 | Aono | |
| 2012/0262408 A1 | 10/2012 | Pasquero et al. | |
| 2012/0313872 A1 | 12/2012 | Zhang et al. | |
| 2013/0135254 A1 | 5/2013 | Lee et al. | |
| 2013/0147739 A1 | 6/2013 | Aberg et al. | |
| 2013/0285977 A1 | 10/2013 | Baharav et al. | |
| 2014/0022215 A1 | 1/2014 | Bulea | |
| 2014/0028575 A1 | 1/2014 | Parivar et al. | |
| 2014/0098065 A1 | 4/2014 | Deichmann et al. | |
| 2015/0188539 A1 * | 7/2015 | Kondo | G06F 3/038 345/173 |
| 2015/0193038 A1 * | 7/2015 | Degner | G06F 3/03547 345/173 |

FOREIGN PATENT DOCUMENTS

| | | |
|---|---|---|
| WO | 2012010303 | 1/2012 |
| WO | 2012034221 | 3/2012 |
| WO | 2012164895 | 12/2012 |
| WO | 2013029641 | 3/2013 |
| WO | 2013145719 | 10/2013 |
| WO | 2014018086 | 1/2014 |
| WO | 2014018111 | 1/2014 |

OTHER PUBLICATIONS

Ugural et al.; "Advanced Strength and Applied Elasticity"; Elsevier, 1975.

* cited by examiner

CANTILEVERED DISPLACEMENT SENSORS AND METHODS OF DETERMINING TOUCHING FORCES ON A TOUCH SCREEN

This application claims the benefit of priority under 35 U.S.C. §119 of U.S. Provisional Application Ser. No. 61/989,057, filed on May 6, 2014, the content of which is relied upon and incorporated herein by reference in its entirety.

FIELD

The present disclosure relates to touch screens and touch screen sensors, and in particular relates to cantilevered displacement sensors that have enhanced measurement sensitivity for touch-screen applications, and also relates to methods of determining touching forces on a touch screen for touches that occur at multiple touch locations.

The entire disclosure of any publication or patent document mentioned herein is incorporated by reference, including U.S. Pat. Nos. 4,455,452; 4,698,460; 4,733,222; 7,254,775; and 8,599,165, and U.S. Pre-Grant Publication No. 2013/0285977.

BACKGROUND

The market for displays and other devices (e.g., keyboards) having touch functionality is rapidly growing. As a result, touch-sensing techniques using touch screens have been developed to enable displays and other devices to have touch functionality. Touch-sensing functionality is gaining wider use in mobile device applications, such as smart phones, e-book readers, laptop computers and tablet computers.

Touch systems having touch screens have been developed so that they respond to a variety of types of touches, such as single touches, multiple touches, swiping, and touches having different pressures. Unfortunately, present-day pressure sensing capability of touch screens is limited by sensor performance. Further, more accurate determination of the touching forces associated with multiple touches is needed to improve the touch-sensing capability of touch screens.

SUMMARY

An aspect of the disclosure is a touch-screen assembly having enhanced displacement measurement sensitivity. The assembly includes: a planar touch screen; a support base having an upper surface and an outer edge; and at least one cantilevered displacement sensor arranged on the upper surface of the support base adjacent the outer edge, the at least one cantilevered displacement sensor having a proximity sensor operably arranged relative to a cantilever member that supports a contact feature, wherein the contact feature contacts the touch screen such that when the touch screen undergoes a displacement toward the support base, the cantilevered member amplifies the displacement, and the proximity sensor measures the amplified displacement.

Another aspect of the disclosure is a displacement sensor for measuring an amplified displacement of a touch screen having a lower surface in a touch-screen assembly. The method includes: a base having a front face and a top surface; a cantilever member having a portion that extends in a cantilevered manner from the base at the top surface, the cantilever member having a upper surface, a lower surface, and a long axis; a contact feature on the upper surface of the cantilever member that contacts the touch screen lower surface at a contact location and that resides a distance x1 from the base front face as measured in the direction of the long axis; and a position sensor arranged adjacent the lower surface of the cantilever member to measure a deflection of the cantilever member at a measurement location at a distance x2 from the front face of the base as measured in the direction of the long axis, wherein $5 \cdot x1 \leq x2 \leq 10 \cdot x1$, so that a displacement of the cantilever member at the contact feature is amplified at the measurement location.

Another aspect of the disclosure is a method of measuring a displacement of a touch screen in a touch-screen assembly. The method includes: supporting the touch screen with at least one cantilevered displacement sensor configured to amplify the displacement of the touch screen; touching the touch screen at a touch location with a downward force that causes the displacement of the touchscreen; and measuring with the at least one cantilevered displacement sensor the amplified displacement.

Another aspect of the disclosure is a method of measuring the touching forces at multiple touch locations on a touch screen. The method includes: determining the multiple touch locations, wherein the touch locations includes respective touch-location areas; measuring multiple displacements of the touch screen at multiple measurement positions that are different from the touch locations; performing a fit to the measured displacements based on the touch locations to obtain displacements at the multiple touch screen positions; relating the displacement of the touch screen at the multiple touch locations to applied distributed loads at the respective multiple touch locations; and determining the touching forces at the multiple touch locations by multiplying each of the applied distributed loads by the corresponding touch-location areas.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

Figure 1:
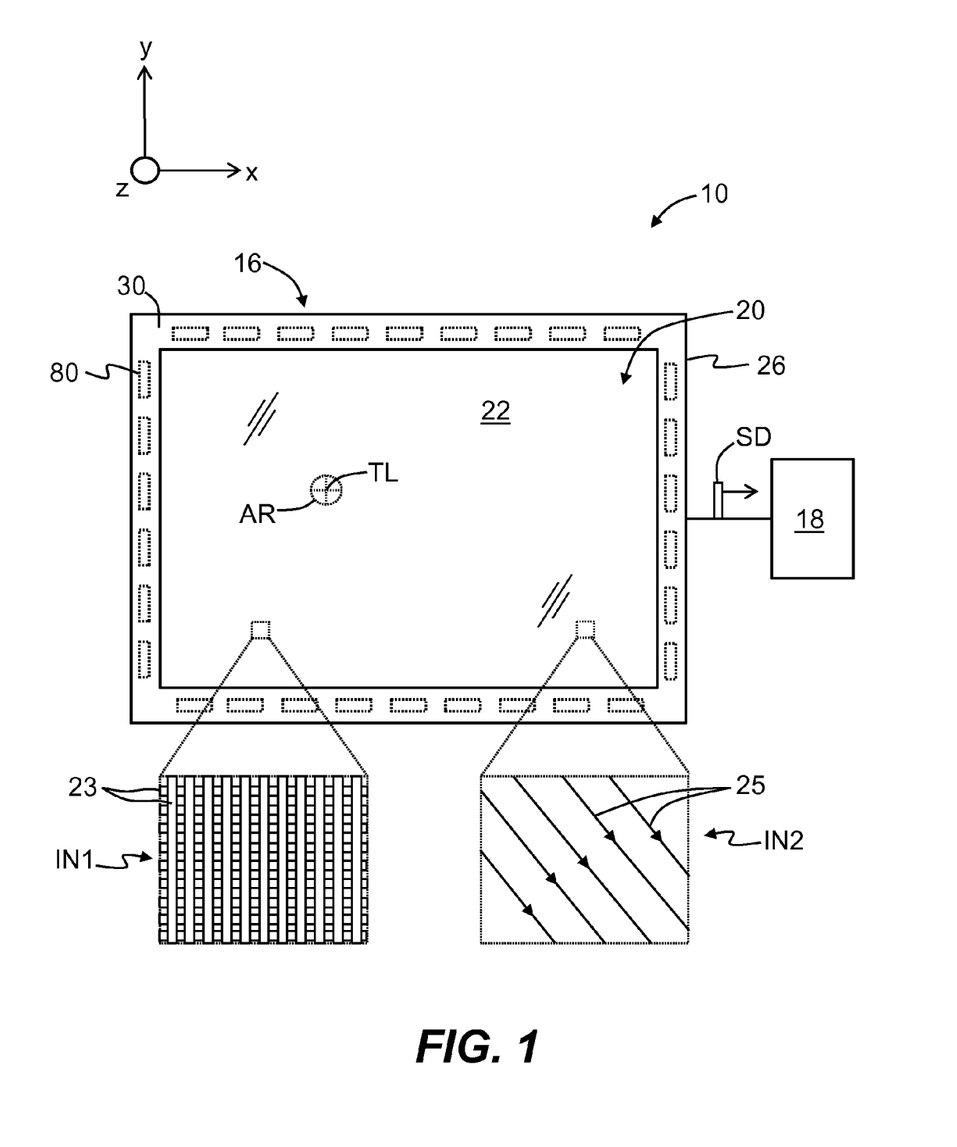
FIG. 1 is a schematic diagram of an example touch-screen display system that includes a touch-screen assembly and a controller, wherein the touch screen assembly includes cantilevered displacement sensors arranged adjacent the perimeter of the touch screen, with first and second close-up insets (denoted IN1 and (IN2) respectively illustrating capacitive touch sensing and optical touch sensing.
Figure 2:
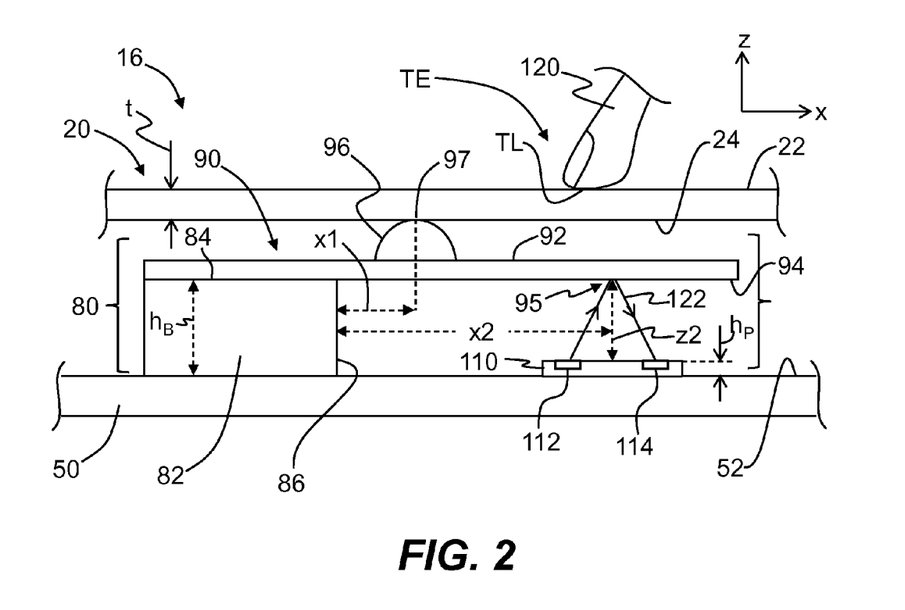
FIG. 2 is a close-up side view of a portion of the touch-screen assembly of FIG. 1 that shows an example cantilevered displacement sensor supported by a support base and operably arranged relative to the touch screen.

FIG. 1 is a schematic diagram of an example touch-screen display system 10 that includes a touch-screen assembly 16 and a controller 18. FIG. 2 is a close-up side view of a portion of touch-screen assembly 16. Controller 18 is operably connected to and configured to control the operation of the touch-screen assembly 16. The touch-screen assembly 16 includes a touch screen cover glass ("touch screen") 20 having an upper surface 22, a lower surface 24, and a perimeter, periphery or edge 26.

An example touch screen 20 is generally rectangular and planar, in which case the upper and lower surfaces 22 define a generally constant thickness t for the touch screen. In an example, touch screen 20 includes a bezel 30 on a portion of upper surface 22 or lower surface 24 adjacent perimeter 26. Bezel 30 serves to hide from view certain portions or components of touch-screen assembly 16, such as cantilevered displacement sensors 80 introduced and discussed in greater detail below. FIG. 2 also shows an implement 120 (e.g., a finger such as shown, or a stylus, a pencil end, etc.) making contact with touch screen 20 of touch screen assembly 16 at a touch location TL to define a touch event TE. Touch location TL has a corresponding touch-area AR.

FIG. 1 includes a first close-up inset IN1 that shows a close-up view of an example touch screen 20 that includes an array of transparent conductive elements 23 configured to provide touch-screen assembly 16 with capacitive touch-sensing capability. FIG. 1 also includes a second close-up inset IN2 that shows a close-up view of an example of touch screen 20 that shows light rays 25 traveling within touch screen 20 to provide touch-screen assembly 16 with optical-based touch-sensing capability.

Figure 3:
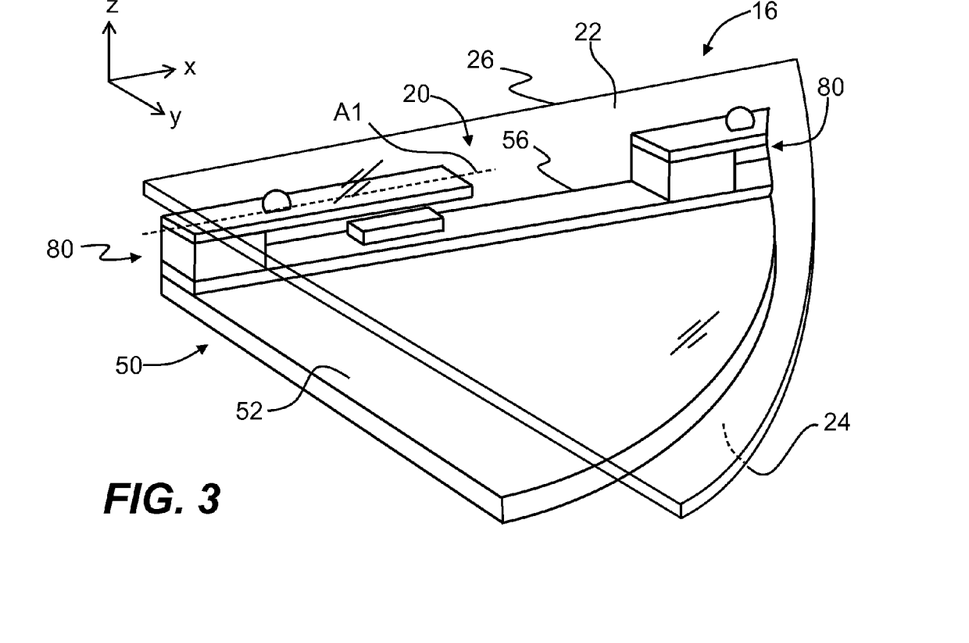
FIG. 3 is an elevated close-up view of a portion of the touch-screen assembly of FIG. 1, illustrating how the cantilevered displacement sensors are arranged along the perimeter of a support base, with the long axis of the cantilevered members generally aligned with (e.g., nominally parallel to) the corresponding adjacent support base perimeter or touch-screen perimeter.

With particular reference to FIG. 2 and also to the elevated close-up view of FIG. 3, touch-screen assembly 16 also includes a support base 50 having an upper surface 52 and a perimeter, periphery or edge 56. Support base 50 supports a plurality of cantilevered displacement sensors 80 on upper surface 52 and adjacent perimeter 56. Support base 50 also operably supports electrical connections (not shown) to cantilevered displacement sensors 80, e.g., by supporting wiring or circuit boards that contain wiring. In an example, cantilevered displacement sensors 80 are also located adjacent touch-screen perimeter 26.

The example cantilevered displacement sensor 80 of FIGS. 2 and 3 includes a base 82 with an upper surface 84 and a front face 86. Base 82 has a base height $h_B$, which in an example is in the range 1.5 mm ≤ $h_B$ ≤ 2 mm. Cantilevered displacement sensor 80 also includes a cantilevered member 90 attached to upper surface 84 of base 82 so that it extends in the x-direction in cantilevered fashion beyond front face 86. In another example, based 82 and cantilevered member 90 are formed as a unitary structure.

Cantilevered member 90 has a long axis A1, an upper surface 92 and a lower surface 94. Cantilevered member 90 is made of a flexible material, such as metal or plastic. In an example, cantilevered member 90 has a generally rectangular shape. In an example, each cantilevered displacement sensor 80 is arranged such that the long axis A1 of cantilevered member 90 runs generally in the same direction as (i.e., substantially parallel to) to the edge 56 of support base 50 adjacent which the cantilevered displacement sensor resides. This configuration avoids having the cantilever member 90 extending toward the center of touch screen 20, which would require a wider bezel 30, which is not shown in FIG. 3 for ease of illustration. In the case where touch screen 20 has a size and shape that generally corresponds to support base 50, the long axis A1 of cantilevered member 90 runs generally in the same direction as (i.e., substantially parallel to) to the edge 26 of touch screen 20 adjacent which the cantilevered displacement sensor resides.

In an example, upper surface 92 of cantilevered member 90 includes a contact feature 96. Contact feature 96 has a location 97 (e.g., a point or small area) that contacts lower surface 24 of touch screen 20, and so this location is referred to hereinafter as contact location 97. In an example, contact feature 96 is a rounded, e.g., comprises at least a section of a sphere. The contact location 97 of contact feature 96 is located a distance x1 (as measured in the x-direction) from front face 86 of base 82, as is best seen in FIG. 2.

Cantilevered displacement sensor 80 also includes a proximity sensor 110 that resides on upper surface 52 of support base 50 such that it resides beneath lower surface 94 of cantilevered member 90 and spaced apart from base 82. Proximity sensor has a height $h_P$, which in an example is nominally 0.7 mm. Proximity sensor 110 can be, for example optics-based, capacitive-based, inductive-based, etc. Proximity sensor 110 is shown as being optics-based by way of illustration and thus includes a light source 112 and a photodetector 114. Light source 112 emits light 122 that illuminates a small region 95 of lower surface 94 of cantilever member 90. Light 122 reflects from small region 95 and is detected by photodetector 114. The location of small region 95 is a distance x2 from front face 86 of base 82. The distance in the z-direction between the proximity sensor 110 and the lower surface 94 of cantilever member 90 is denoted z2. Proximity sensor 110 is configured to determine the distance z2, which can change when touch screen 20 is displaced or deformed due to one or more touch events TE. In the case of an optics-based proximity sensor 100 as shown, the distance z2 is measured based on travel time of light 122 over the optical path from light source 112 to small region 95 of lower surface 94 and then to photodetector 114.

Figure 4:
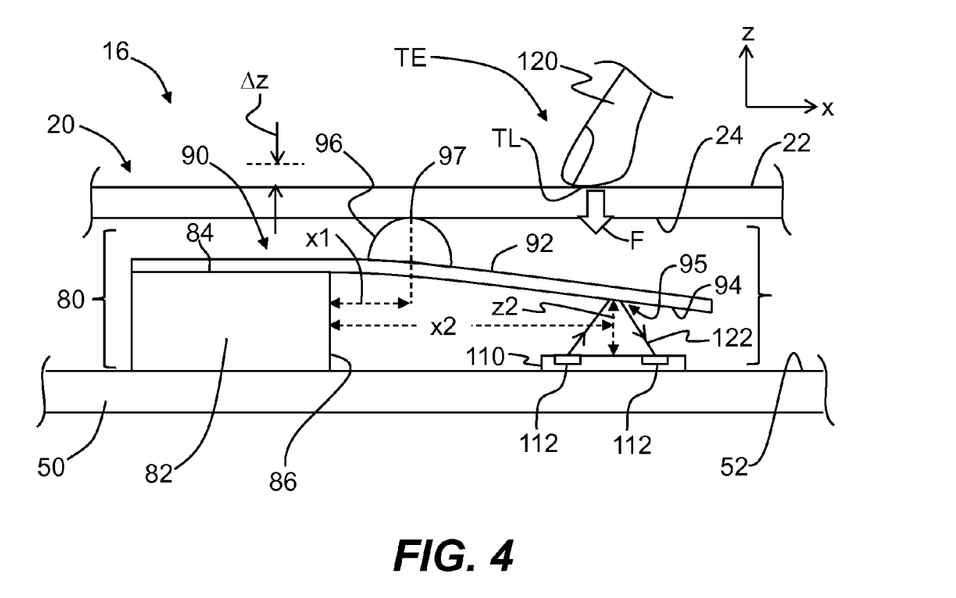
FIG. 4 is similar to FIG. 2 and shows the deflection of the cantilevered member caused by the touching force applied at a touch location on the touch screen as caused by a touching implement in the form of a user's finger.

FIG. 4 is similar to FIG. 2 and shows implement 120 causing a displacement $\Delta z$ of touch screen 20 in the −z direction due to a touching force F at touch location TL due to touch event TE. The dashed line in FIG. 4 for the measurement of $\Delta z$ indicates the original location of top surface 22 of touch screen 20 prior to the touching force F being applied. The touching force F that causes the displacement of touch screen 20 is transferred to cantilever member 90 through contact feature 96. The transferred touching force F in turn causes cantilevered member 90 to flex or deflect so that the distance z2 is reduced as compared to its value when there is no touching force F. The amount of applied pressure P at touch location TL is defined as P=F/A, where AR is the area associated with touch location TL.

Figure 5:
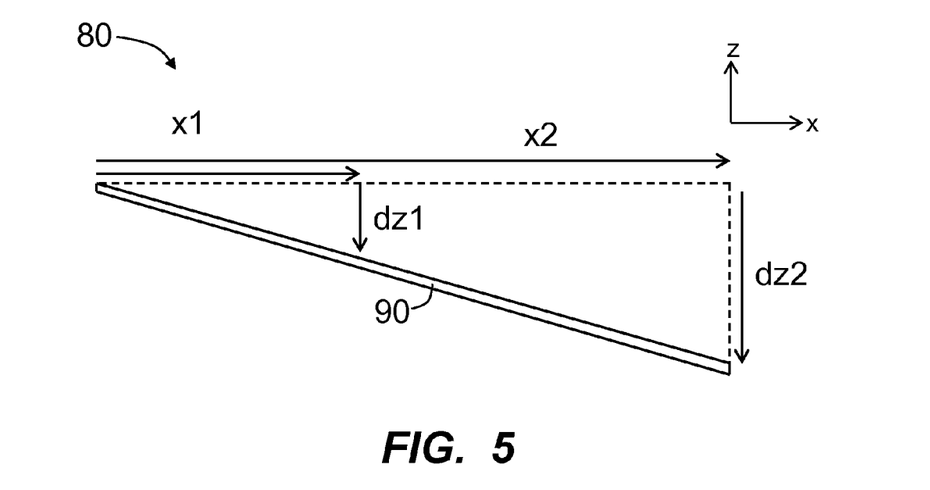
FIG. 5 is a close up view of the cantilever member of the cantilevered displacement sensor and illustrates the geometry of how the displacement dz1 of the cantilevered member near the base of the cantilevered member is amplified to form a larger displacement dz2 near the end of the cantilevered member.

FIG. 5 is a close-up view of cantilever member 90 as deflected by touching force F and illustrates the geometry of how the cantilevered member acts to amplify the displacement caused by the touch event at touch location TL. The distances x1 and x2 are shown, along with the z-direction displacement dz1 of cantilever member 90 at distance x1 and the z-direction displacement dz2 of the cantilever member at distance x2. Displacements dz1 and dz2 are measured relative to an undeflected cantilever member 90 for which dz1=dz2=0.

By the basic geometry of similar triangles, it can be seen from FIG. 5 that dz1/x1=dz2/x2, so that dz2=$\alpha$·dz1, where $\alpha$=x2/x1 is an amplification factor that represents how cantilever member 90 amplifies the displacement dz1. In an example, the amplification factor $\alpha$ is in the range $5 \leq \alpha \leq 10$. Also in an example, distance x1 is in the range from 1 mm to 2 mm, and distance x2 is in the range from 5 mm to 12 mm. The increase in the sensitivity of the measurement of the displacement of touch screen 20 is, to at least a first approximation, given by the amplification factor $\alpha$.

The displacement amplification provided by cantilevered displacement sensor 80 allows for greater measurement sensitivity for the displacement of touch screen 20. This in turn allows for a more precise determination of the touching force F applied at touch location TL by implement 120 using, for example, the methods described below.

With reference again to FIG. 1, in an example, touch-screen assembly 16 includes multiple cantilevered displacement sensors 80 arranged adjacent perimeter 56 of support base 50, so that the measurement positions of the displacement are adjacent the touch screen perimeter 26. Each cantilevered displacement sensor 80 generates an electrical displacement signal SD representative of the measured displacement dz2. In an example, displacement signals SD from the different cantilevered displacement sensors 80 are sent to controller 18 and compared to one or more touch locations TL as established by touch-sensing capability of touch screen 20 (e.g., the capacitive or optical touch-sensing capability).

Information about the one or more touch locations TL can be used to more precisely calculate the touching force or forces F. In addition, the differences in the displacement signals SD due to the different measurement positions of the cantilevered displacement sensors 80 also provides additional information about the touch location TL. Such information can prove useful when touch screen 20 does not have position-sensing capability, e.g., is simply a non-sensing cover sheet. Note that in FIG. 1, the displacement measurements made by cantilevered displacement sensors 80 will typically occur at measurement positions that are different from the touch location TL when the displacement sensors are arranged adjacent the respective perimeters 26 and 56 of touch screen 20 and support base 50.

Figure 6:
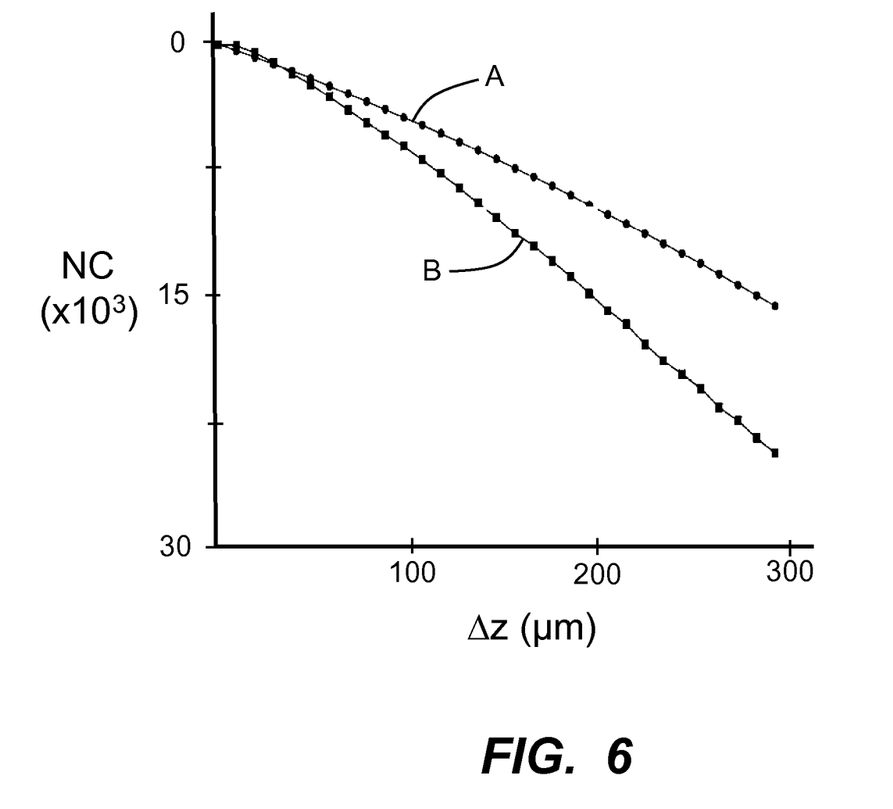
FIG. 6 is a plot of the normalized counts NC ($\times 10^3$) from the cantilevered displacement sensor versus the displacement $\Delta z$ (μm) for both an unaided (non-cantilevered) proximity sensor (curve A) and for the cantilevered displacement sensor (curve B)

FIG. 6 is a plot of the normalized counts NC ($\times 10^3$) versus the displacement $\Delta z$ ($\mu m$) for a conventional (unaided) proximity sensor (curve A) and for the cantilevered displacement sensor 80 (curve B). The plot shows an improvement in the signal response for the cantilevered displacement sensor 80 as compared to the conventional proximity sensor. In the experimental apparatus that measured the data of FIG. 6, cantilevered member 90 was made of metal machined from 0.008" thick spring steel to provide an amplification factor $\alpha$ of 9.2. The cantilevered displacement sensor 80 had an x1 value of 0.047" (or 1.2 mm) and an x2 value of 0.434" (or 11 mm).

Determining Multiple Touching Forces

As noted above, there are a number of touch-screen applications where the touching force F for each of multiple touch locations TL is of particular interest, e.g., for tablets, smart phones, phablets, laptop computers, personal computers, televisions, etc. Accordingly, an aspect of the disclosure is directed to methods of determining the touching forces F associated with multiple touch events TE at multiple touch locations TL on touch screen 20 of touch-screen assembly 16. The methods relate the touching forces F to the measured displacements $\Delta z$ of touch screen 20, wherein for example, the displacements are measured using touch-screen assembly 16 that employs multiple cantilevered displacement sensors 80, as discussed above. In particular, in most situations the displacements are measured at measurement positions that are away from the touch locations so that the touching forces F at the touch locations have to be determined from the measured displacement at the measurement positions.

Figure 7A:
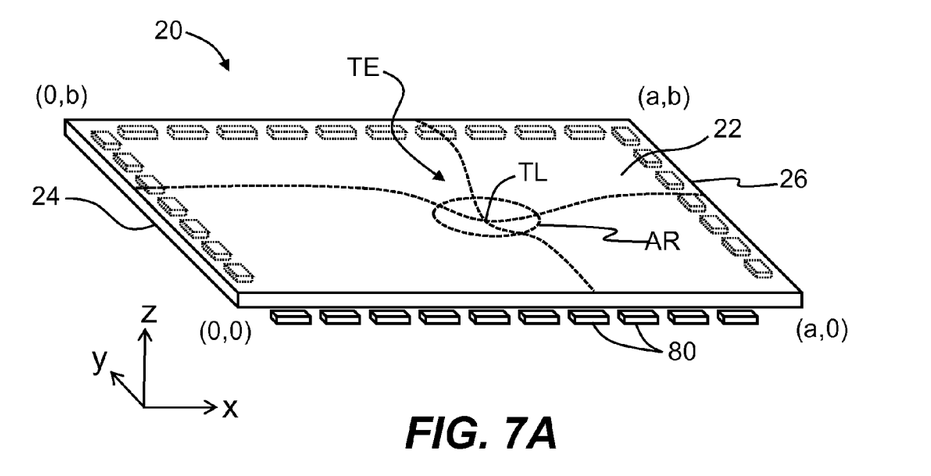
FIGS. 7A and 7B are elevated views of an example touch screen and an example configuration of cantilevered displacement sensors, showing an example deformation (displacement) of the touch screen for a single touch (FIG. 7A) and for two touches (FIG. 7B).
Figure 7B:
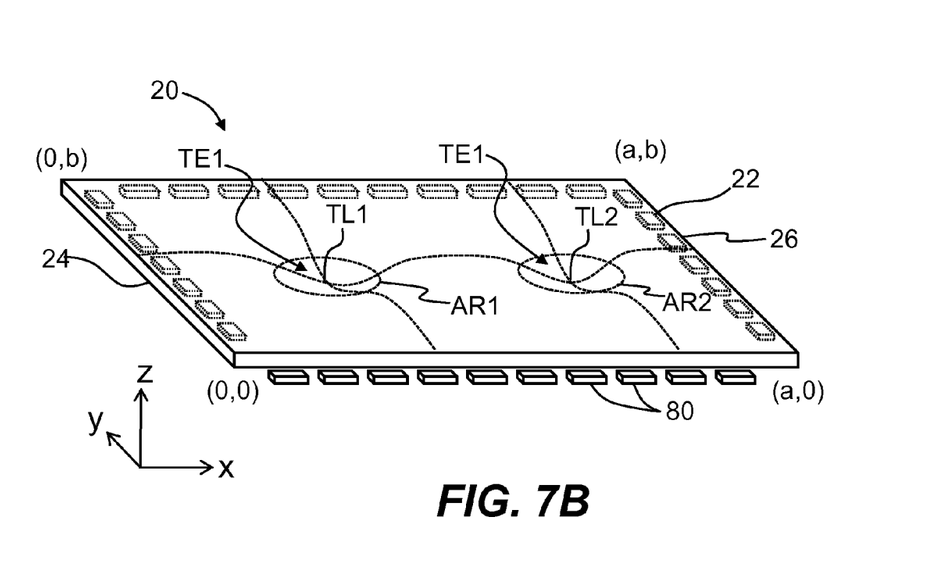

FIG. 7A is an elevated view of an example touch screen 20 and an example arrangement of cantilevered displacement sensors 80 that shows a single touch location TL associated with a single touch event TE. FIG. 7B is similar and shows the example touch screen with two touch locations TL1 and TL2 associated with respective touch events TE1 and TE2. As discussed above in connection with FIG. 1, the area associated with a given touch location TL is denoted AR and is called the touch-location area. In an example, the touch-location area AR is defined by the contact area of implement 20 (not shown; see FIG. 2) that makes contact with the touch screen 20 at the touch location TL. In FIG. 7B, the touch locations TL1 and TL2 have corresponding touch-location areas AR1 and AR1, which need not be equal in size. In an example, the touch-location areas AR are measured using either the capacitive-sensing or optical-sensing capability of touch screen 20.

The displacements $\Delta z$ of touch screen 20 (see FIG. 4) are measured in the z-direction and are respectively denoted $\Delta z1$ and $\Delta z2$ for the two touch events TL1 and TL2. The methods disclosed herein are described in part in connection with two touch locations TL1 and TL2 by way of example and for ease of discussion. The methods disclosed herein can be applied to more than two touch events TE and corresponding touch locations TL.

As s noted above, in most cases the measured displacements Δz are made at measurement positions that are different than the touch locations TL. For example, the displacement measurements are made using cantilevered displacement sensors 90 arranged at positions adjacent the perimeter 26 of touch screen 20 while the touch locations TL are made away from the perimeter of the touch screen, e.g., closer to the center of the touch screen. Consequently, finding the amount of force applied at the touch locations first requires finding the amount of displacement at the different touch locations.

The information about the touch locations TL1 and TL2 is known and is provided by the touch-sensing capability of touch screen 20. In some embodiments, a lookup table is used to convert cover-glass deflection to applied force. The lookup table consists of a matrix containing coefficients representing the linear approximation of force to displacement. These coefficients are indexed using the positions of the applied forces. A unique lookup table is generated for each sensor. When a force is applied at a known location, all lookup tables are indexed by position and their coefficients applied to the known change in displacement. Weighting a least squares algorithm using the coefficients will more accurately calculate the applied force by placing a higher priority on sensors with greater range. The lookup table compensates for small differences in deflection due to construction or differences in chassis.

Alternatively, in some embodiments, conversion of cover-glass deflection to applied force for touch locations TL1 and TL2 is accomplished via determination of a best fit to the curvature (shape) of touch screen 20 associated with the displacements Δz1 and Δz2. This fit is forced to have maxima (or substantial maxima) associated with the touch locations TL. A fourth-order differential equation that relates the touching forces F to the displacements Δz is then solved by expressing the touching force F and the displacements Δz as respective Fourier series. Once the fourth-order differential equation is solved, the Fourier coefficients for the touching forces F and the displacements Δz can be related to each other.

One aspect of the method includes performing a fit to the measured displacement data based on using the (x,y) touch-location information of touch screen 20. The fit provides the (x,y) spatial coordinates of the touching forces F1 and F2 associated with touch locations TL1 and TL2. In an example a least-squares fit is used, wherein the displacements Δz are substantially forced to match the boundaries conditions (e.g., substantially fixed edges with no displacement) and to have respective (substantial) maxima at the touch locations TL.

The relationship of the touching forces F to the displacements Δz in the z-direction can be expressed as a fourth order differential equation that can be solved using a Fourier series describing the displacement Δz. Then the forces F based on the (x,y) information can also be described with another Fourier series and the coefficients of both series can be directly related to one another.

The following parameters are used in the mathematical treatment below:
x,y=touch-screen coordinates.
a,b=touch-screen lengths.
$(cx_1,cy_1)$ and $(cx_2,cy_2)$=touch coordinates for touch locations TL1 and TL2.
$e_{i,j}$=expansion coefficients of the touch screen displacement "best fit."
$wx_1, wy_1, wx_2, wy_2$=effective half widths of the curvature associated with the displacement of the touch screen due at touch locations TL1 and TL2.
$x_m, y_n$=the coordinate locations of the cantilevered displacement sensors 80.
I=Least-squares function to be minimized.
D=displacement vector composed of sensor displacement values.
t=thickness of touch screen
$A_{m,n}$=Fourier coefficients of the Fourier expansion of the displacement.
AR=touch-location area.

Fitting the displacement curvature is thus performed using the measured data at specific coordinates $(x_m, y_n)$, say for two touch locations TL1 and TL2 that have coordinates $(cx_1,cy_1)$ and $(cx_2,cy_2)$. To ensure maxima at each of the touch locations TL1 and TL2, the displacement Δz is re-defined as function $f(x,y)$ and is expressed as follow:

$$f(x,y) = \eta_{x1} \cdot \eta_{y1} \cdot \eta_{x2} \cdot \eta_{y2} \tag{1}$$

wherein:

$$\eta_{x1} = \exp\{-(x-cx_1)^2/wx_1^2\} \tag{1a}$$

$$\eta_{y1} = \exp\{-(y-cy_1)^2/wy_1^2\} \tag{1b}$$

$$\eta_{x2} = \exp\{-(x-cx_2)^2/wx_2^2\} \tag{1c}$$

$$\eta_{y2} = \exp\{-(x-cy_2)^2/wy_2^2\} \tag{1d}$$

The displacement data is then fit at the specific coordinates using f(x,y) (Eq. 1) and the following function (Eq. 2):

$$F(x,y) = \Sigma e_{i,j} \sin(i\pi x/a) \cdot \sin(j\pi y/b) \cdot f(x,y) \tag{2}$$

where a and b are the maximum lengths of x and y. The coefficients can be found using a least squares fit. Thus, the least-squares function I is defined as follows (Eq. 3):

$$I = [\Sigma_{m,n} \Sigma_{i,j} \{e_{i,j} F_{i,j}(x_m,y_n) - D(x_m,y_n)\}]^2 \tag{3}$$

where $D(x_m,y_n)$ represents the displacement at $(x_m,y_n)$.

To minimize I, $\delta I/\delta e_{i,j}$ is set equal to 0, i.e., $$I/\delta e_{i,j} = 0. \tag{4}$$

Equation 4 yields a matrix equation from which the coefficients $e_{i,j}$ can be obtained. The matrix equation can be written as follows:

$$M \cdot e_{i,j} = D. \tag{5}$$

To specify M and D, two coordinates are assumed in x and two in y for measured displacement values. So, below a sum over all the values m=1,2 and n=1,2 is assumed. In this case, D is the column vector and is represented as follows (Eqs. 6a-6d):

$$D(1) = D_{m,n} \cdot F_{11}(x_m,y_n) \tag{6a}$$

$$D(2) = D_{m,n} \cdot F_{12}(x_m,y_n) \tag{6b}$$

$$D(3) = D_{m,n} \cdot F_{21}(x_m,y_n) \tag{6c}$$

$$D(4) = D_{m,n} \cdot F_{22}(x_m,y_n) \tag{6d}$$

So now with the best fit to the displacement F(x,y) for touch screen 20 obtained using a least-squares and using the touch location information, the touching forces F for each touch location TL can be determined using the relationship between the displacement and the force for a thin rectangular sheet. This relationship is required to satisfy a $4^{th}$ order differential equation (set forth below) that relates displacement to the applied distributed load (force/area), as described for example, in the text by Ugural and Fenster, entitled "Advanced Strength and Applied Elasticity," Elsevier, 1975, where it is shown that a Fourier series expansion of a load satisfies this $4^{th}$ order equation and that the displacement is also a Fourier series, but with different expansion coefficients.

Eq. (2) above is not a Fourier series per se, since the displacement was forced to have maxima at the touch locations TL by introducing the exponentials terms. But, the solution F(x,y) can be expanded in terms of a Fourier series to yield the following (Eq. 8):

$$F(x,y)=\Sigma_{m,n}A_{m,n}\sin(m\pi x/a)\sin(n\pi y/b) \qquad (8)$$

The orthogonal properties of the Fourier series are used to determine the coefficients $A_{m,n}$ The load distribution can now be obtained since a relationship exists between the load distribution and the displacement. The load distribution and the displacement satisfy the aforementioned fourth-order differential equation (Eq. 9):

$$\delta^4 F/\delta x^4 + 2\delta^4 F/\delta x^2 \delta y^2 + \delta^4 F/\delta y^4 = P/Q \qquad (9)$$

where P is the load per unit area and Q is given by (Eq. 10)

$$Q=Et^3/(12(1-v^2)). \qquad (10)$$

where E is Young's modulus and v is Poisson's ratio.

The load distribution can be expressed as a Fourier series, where the expansion coefficients $P_{m,n}$ are related to the displacement coefficients as follows (Eq. 11):

$$P_{m,n}=Q\pi^4 A_{m,n}[(m/a)^2+(n/b)^2]^2 \qquad (11)$$

Once the load distribution is calculated, the touching force F is immediately determined by converting the load distribution at the touch locations TL multiplied by the corresponding touch-location area AR, based on the calculated load distribution.

The above method can be summarized as follows: a) measuring the touch locations TL, wherein the touch locations include respective touch-location areas AR; b) measuring multiple displacements of the touch screen at multiple positions that are different from the touch locations TL; c) performing a fit to the measured displacements based on the touch locations TL to obtain displacements at the touch locations TL; d) relating the displacement of the touch screen at the multiple touch locations to applied distributed loads at the respective multiple touch locations; and e) determining the touching forces at the multiple touch locations by multiplying each of the applied distributed loads by the corresponding touch-location areas AR.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A touch-screen assembly having enhanced displacement measurement sensitivity, comprising:
a planar touch screen;
a support base having an upper surface and an outer edge; and
at least one cantilevered displacement sensor arranged on the upper surface of the support base adjacent the outer edge, the at least one cantilevered displacement sensor having a proximity sensor operably arranged relative to a cantilever member that supports a contact feature, wherein the contact feature contacts the touch screen such that when the touch screen undergoes a displacement toward the support base, the cantilevered member amplifies the displacement, and the proximity sensor measures the amplified displacement.

2. The touch-screen assembly of claim 1, wherein the at least one cantilevered displacement sensor comprises a plurality of cantilevered displacement sensors that operably support the touch screen relative to the support base.

3. The touch-screen assembly of claim 1, wherein the cantilever member has a long axis, and wherein the at least one cantilevered displacement member is arranged such that the long axis is substantially parallel to the adjacent outer edge of the support base.

4. The touch-screen assembly of claim 1, wherein the amplification of the displacement is defined by amplification factor α in the range $5 \leq \alpha \leq 10$.

5. The touch-screen assembly of claim 1, wherein in the position sensor is either optics-based or capacitive-based.

6. The touch-screen assembly of claim 1, wherein the contact feature is rounded.

7. A displacement sensor for measuring an amplified displacement of a touch screen having a lower surface in a touch-screen assembly, comprising:
a base having a front face and a top surface;
a cantilever member having a portion that extends in a cantilevered manner from the base at the top surface, the cantilever member having a upper surface, a lower surface, and a long axis;
a contact feature on the upper surface of the cantilever member that contacts the touch screen lower surface at a contact location and that resides a distance x1 from the base front face as measured in the direction of the long axis; and
a position sensor arranged adjacent the lower surface of the cantilever member to measure a deflection of the cantilever member at a measurement location at a distance x2 from the front face of the base as measured in the direction of the long axis, wherein $5 \cdot x1 \leq x2 \leq 10 \cdot x1$, so that a displacement of the cantilever member at the contact feature is amplified at the measurement location.

8. The displacement sensor of claim 7, wherein the contact feature is rounded.

9. A touch screen assembly, comprising:
the touch screen;
a support base having an upper surface end an outer edge; and
at least one of the displacement sensors of claim 7 disposed on the upper surface of the support base adjacent the outer edge of the support base.

10. The touch screen assembly of claim 9, wherein the cantilever member has a long axis, and wherein the at least one cantilevered displacement member is arranged such that the long axis is substantially parallel to the adjacent outer edge of the support base.

11. The touch screen assembly of claim 9, wherein the at least one cantilevered displacement sensor comprises a plurality of cantilevered displacement sensors that operably support the touch screen relative to the support base.

12. A method of measuring a displacement of a touch screen in a touch-screen assembly, comprising:
supporting the touch screen with at least one cantilevered displacement sensor configured to amplify the displacement of the touch screen, the at least one cantilevered displacement sensor having a proximity sensor operably arranged relative to a cantilever member that supports a contact feature that contacts the touch screen;

arranging the at least one cantilevered displacement sensor on a support base;

receiving a touch of the touch screen at a touch location with a downward force that causes the displacement of the touchscreen; and measuring with the at least one cantilevered displacement sensor the amplified displacement.

13. The method according to claim 12, wherein the amplification of the displacement is between 5× and 10×.

14. The method according to claim 12, wherein at least one cantilevered displacement sensor has a long axis, and further including supporting the at least one cantilevered displacement sensor adjacent an outer edge of the support base, with the long axis substantially parallel to the outer edge.

15. The method according to claim 12, wherein the at least one cantilevered displacement sensor comprises a plurality of displacement sensors, and including measuring amounts of the displacement with each of the cantilevered displacement sensors.

\* \* \* \* \*